US010859028B2

United States Patent
Horiuchi et al.

(10) Patent No.: US 10,859,028 B2
(45) Date of Patent: Dec. 8, 2020

(54) ENGINE FUEL INJECTION CONTROL DEVICE

(71) Applicant: MAZDA MOTOR CORPORATION, Hiroshima (JP)

(72) Inventors: Hiroaki Horiuchi, Hiroshima (JP); Shuhei Shintani, Hiroshima (JP); Shigeru Nakagawa, Hiroshima (JP)

(73) Assignee: MAZDA MOTOR CORPORATION, Hiroshima (JP)

( * ) Notice: Subject to any disclaimer, the term of this patent is extended or adjusted under 35 U.S.C. 154(b) by 339 days.

(21) Appl. No.: 15/763,209

(22) PCT Filed: Nov. 4, 2016

(86) PCT No.: PCT/JP2016/082830
§ 371 (c)(1),
(2) Date: Mar. 26, 2018

(87) PCT Pub. No.: WO2017/086189
PCT Pub. Date: May 26, 2017

(65) Prior Publication Data
US 2019/0055896 A1 Feb. 21, 2019

(30) Foreign Application Priority Data

Nov. 19, 2015 (JP) .................. 2015-226825

(51) Int. Cl.
*F02D 41/40* (2006.01)
*F02D 41/24* (2006.01)
(Continued)

(52) U.S. Cl.
CPC ........... *F02D 41/401* (2013.01); *F02D 41/20* (2013.01); *F02D 41/2096* (2013.01);
(Continued)

(58) Field of Classification Search
CPC ............. F02D 2041/2044; F02D 41/20; F02D 41/2096; F02D 41/2467; F02D 41/34;
(Continued)

(56) References Cited

U.S. PATENT DOCUMENTS

| 5,402,760 A * | 4/1995 | Takeuchi ................ F02D 41/20 123/300 |
| 10,190,526 B2 * | 1/2019 | Nehl .................... F16K 31/0675 |

(Continued)

FOREIGN PATENT DOCUMENTS

| JP | H06-101552 A | 4/1994 |
| JP | H10-266885 A | 10/1998 |

(Continued)

OTHER PUBLICATIONS

200423 JP10-266885 Oct. 1998 Hagura Nobuhiro machine translation (Year: 1998).*

(Continued)

*Primary Examiner* — Carl C Staubach
(74) *Attorney, Agent, or Firm* — Studebaker & Brackett PC

(57) ABSTRACT

Disclosed is a fuel injection control device for an engine equipped with a solenoid-type fuel injector 67. The fuel injection control device comprises: a voltage sensor SW19 configured to detect a voltage of a solenoid of the fuel injector 67; and a PCM 10 configured to set a valve-open period of the fuel injector 67, based on a fuel injection amount according to an operation state of the engine 1, and control the fuel injector 67 based on the valve-open period. The PCM 10 is configured to perform correction for gradually shortening the set valve-open period, as the voltage (residual voltage) detected by the voltage sensor SW19

(Continued)

when opening the fuel injector becomes larger, and control the fuel injector 67 based on the corrected valve-open period.

17 Claims, 8 Drawing Sheets

(51) Int. Cl.
  *F02D 41/34* (2006.01)
  *F02D 41/20* (2006.01)
  *F02M 63/00* (2006.01)

(52) U.S. Cl.
  CPC ......... *F02D 41/2467* (2013.01); *F02D 41/34* (2013.01); *F02D 41/40* (2013.01); *F02D 41/402* (2013.01); *F02M 63/0015* (2013.01); *F02D 2041/2044* (2013.01); *Y02T 10/40* (2013.01)

(58) Field of Classification Search
  CPC ...... F02D 41/40; F02D 41/401; F02D 41/402; F02M 63/0015; Y02T 10/44
  See application file for complete search history.

(56) References Cited

U.S. PATENT DOCUMENTS

| | | | | |
|---|---|---|---|---|
| 2015/0267668 | A1* | 9/2015 | Gopalakrishnan | H03K 17/64 239/585.1 |
| 2015/0285175 | A1* | 10/2015 | Parrish | F02D 41/222 123/480 |
| 2016/0177855 | A1* | 6/2016 | Kusakabe | F02M 65/005 123/490 |
| 2017/0204805 | A1* | 7/2017 | Nehl | F16K 31/0675 |

FOREIGN PATENT DOCUMENTS

| | | |
|---|---|---|
| WO | 2013/191267 A1 | 12/2013 |
| WO | 2015/015541 A1 | 2/2015 |

OTHER PUBLICATIONS

International Preliminary Report on Patentability and Written Opinion issued in PCT/JP2016/082830; dated May 22, 2018.

International Search Report issued in PCT/JP2016/082830; dated Jan. 31, 2017.

An Office Action; "Notification of Reasons for Rejection," mailed by the Japanese Patent Office dated Sep. 25, 2017, which corresponds to Japanese Patent Application No. 2015-226825, with concise English Translation.

\* cited by examiner

ENGINE FUEL INJECTION CONTROL DEVICE

TECHNICAL FIELD

The present invention relates to an engine fuel injection control device, and particularly to a fuel injection control device for an engine (internal combustion engine) equipped with a solenoid-type fuel injector (fuel injection valve).

BACKGROUND ART

Heretofore, there has been known a technique of using a solenoid-type fuel injector and controlling the fuel injector to perform fuel injection two times or more (referred to as "multistage injection" or "split injection") for each combustion event in a cylinder of an engine (internal combustion engine). It is known that, in the case of performing fuel injection two times or more, for example, two times, a residual magnetism (i.e., residual magnetic flux) occurs in a solenoid of the fuel injector during the first fuel injection, and thereby, in the second fuel injection, a response speed of the fuel injector is increased, leading to a situation where the second fuel injection is started at a timing earlier than an instructed (intended) timing, and a fuel injection amount is increased by an amount corresponding to premature valve-opening of the fuel injector. It is also known that, in particular, as an injection interval in the multistage injection becomes shorter, such a residual magnetism becomes larger, so that the second fuel injection is started earlier, and thus the fuel injection amount is much more increased As measures against the above problem, for example, in the following Patent Document 1, there is disclosed a technique of correcting the fuel injection amount and/or the fuel injection timing to be applied to the second fuel injection, depending on a residual magnetism having occurred in the solenoid of the fuel injector during the first fuel injection.

CITATION LIST

Patent Document

Patent Document 1: Japanese Patent Laid-Open No. 06-101552A

SUMMARY OF INVENTION

Technical Problem

In the technique described in the Patent Document 1, the fuel injection amount and/or the fuel injection timing to be applied to the second or subsequent fuel injection (any subsequent fuel injection after the first fuel injection) are corrected based on the residual magnetism in the solenoid of the fuel injector. However, there has been difficulty in measuring such a residual magnetism in the solenoid. The inventors of the present invention have found that a voltage across a solenoid of a fuel injector changes according to a residual magnetism in the solenoid (this voltage across the solenoid corresponding to the residual magnetism in the solenoid will hereinafter be referred to as "residual voltage"). That is, it has been found that, in the second or subsequent fuel injection, the fuel injection is prematurely started and thus the fuel injection amount is increased, depending on a residual voltage having occurred in the solenoid of the fuel injector by the first fuel injection. This voltage across the solenoid of the fuel injector can be easily detected. Therefore, it would be desirable to execute control of the second or subsequent fuel injection, based on a residual voltage in the solenoid of the fuel injector.

The present invention has been made to solve the above conventional problem, and an object thereof is to provide an engine fuel injection control device capable of adequately executing a fuel injection control based on a residual voltage in a solenoid of a fuel injector.

Solution to Technical Problem

In order to achieve the above object, the present invention provides an engine fuel injection control device equipped with a solenoid-type fuel injector. The engine fuel injection control device includes: a voltage sensor configured to detect a voltage of a solenoid in the fuel injector; and a controller configured to set a valve-open period of the fuel injector based on an fuel injection amount according to an operation state of the engine, in order to control the fuel injector based on the set valve-open period, wherein the controller is configured to correct the set valve-open period so that said valve-open period becomes shorter as the voltage detected by the voltage sensor at the time of opening the fuel injector becomes larger, in order to control the fuel injector based on the corrected valve-open period.

In the engine fuel injection control device of the present invention having the above feature, a residual voltage corresponding to a residual magnetism in the solenoid of the fuel injector is detected, and the valve-open period of the fuel injector is gradually shortened as the detected residual voltage has a larger value, so that it becomes possible to apply, to the fuel injector, an adequate valve-open period set by taking into account an influence of the residual magnetism in the solenoid of the fuel injector. This makes it possible to adequately inject a desired amount (required amount) of fuel from the fuel injector, irrespective of the influence of the residual magnetism in the solenoid of the fuel injector. As a result, it is possible to adequately suppress variation in output torque, degradation in emission quality, or the like, due to deviation of the fuel injection amount from its desired amount.

Further, the residual voltage in the solenoid of the fuel injector is a parameter adequately expressing the residual magnetism in the solenoid, and can be adequately detected by providing a sensor on a connection line between a given controller (PCM, etc.) for controlling the engine, and the solenoid of the fuel injector. Thus, it is possible to realize the fuel injection control according to the present invention, by a simple configuration.

In order to achieve the above object, according to another aspect of the present invention, there is provided an engine fuel injection control device equipped with a solenoid-type fuel injector. The engine fuel injection control device includes: a voltage sensor configured to detect a voltage of a solenoid in the fuel injector; and a controller configured to derive an attenuation characteristic of a residual voltage of the solenoid in the fuel injector based on a variation of the voltage detected by the voltage sensor, and configured to set a valve-open period of the fuel injector based on an fuel injection amount according to an operation state of the engine, in order to control the fuel injector based on the set valve-open period, wherein the controller is configured to estimate the residual voltage at the timing of fuel injection, from the derived attenuation characteristic, and is configured to correct the set valve-open period based on the estimated residual voltage.

In the engine fuel injection control device of the present invention having the above feature, the attenuation characteristic of the residual voltage is derived based on a detected voltage change in the solenoid of the fuel injector, and the residual voltage at a timing of triggering fuel injection is estimated from the attenuation characteristic, to correct the valve-open period of the fuel injector. This also makes it possible to adequately inject a desired amount of fuel from the fuel injector, irrespective of the influence of the residual magnetism in the solenoid of the fuel injector.

Preferably, in the engine fuel injection control device of the present invention, the controller is configured to correct the set valve-open period so that the said valve-open period becomes shorter as the residual voltage becomes larger.

According to this feature, an adequate valve-open period according to the estimated residual voltage can be applied to the fuel injector, so that it becomes possible to reliably inject a desired amount of fuel from the fuel injector.

Preferably, in the engine fuel injection control device of the present invention, the controller is configured to control the fuel injector to perform fuel injection two times or more for each combustion event in a cylinder of the engine, and is configured to correct the valve-open period of the fuel injector at the time of a second or subsequent fuel injection.

Effect of Invention

The engine fuel injection control device of the present invention is capable of adequately executing the fuel injection control based on the residual voltage in the solenoid of the fuel injector.

DESCRIPTION OF EMBODIMENTS

With reference to the accompanying drawings, an engine fuel injection control device according to one embodiment of the present invention will now be described.

<Device Configuration>

Figure 1:
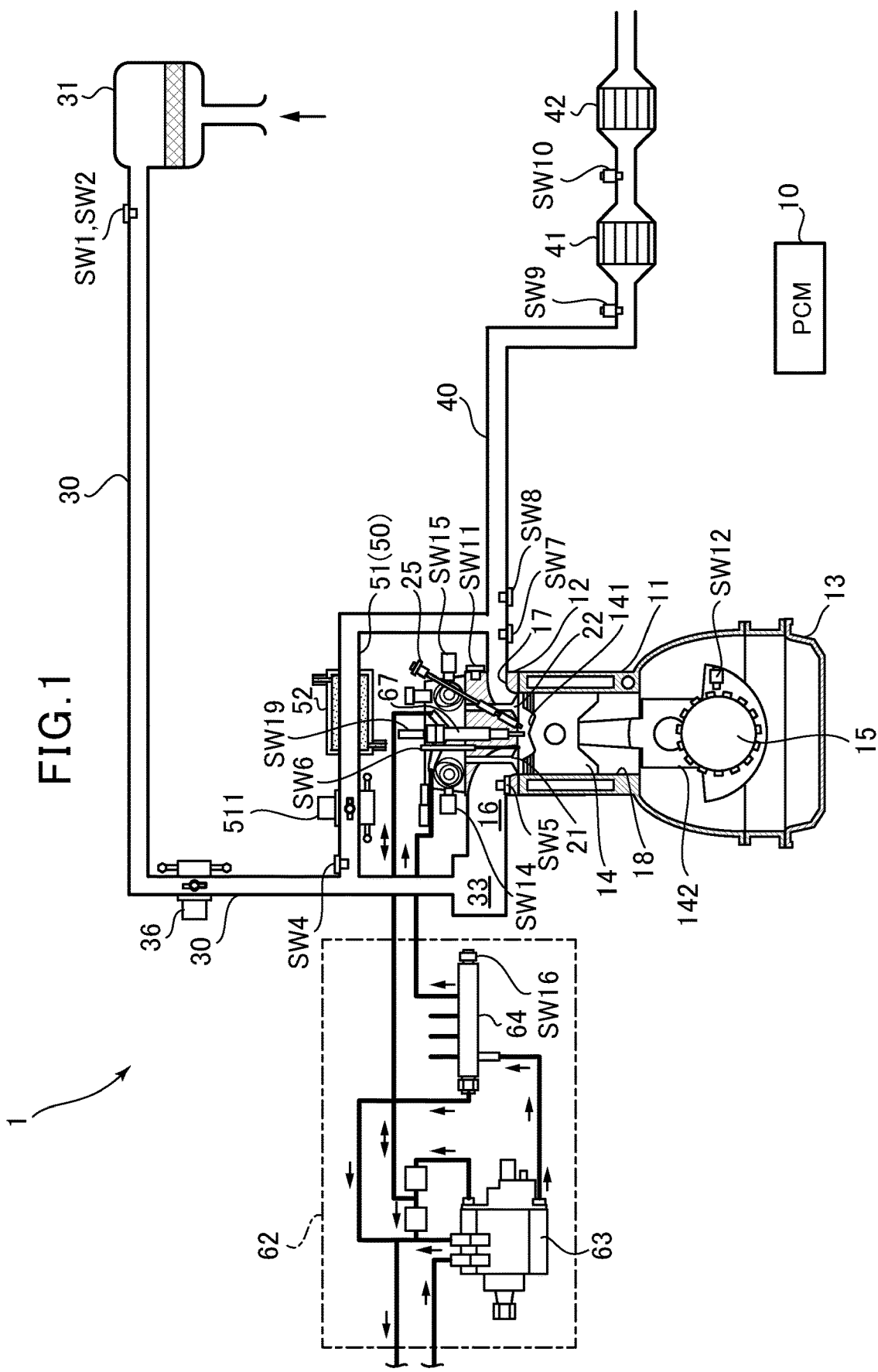
FIG. 1 is a schematic diagram depicting a configuration of an engine employing an engine fuel injection control device according to one embodiment of the present invention.
Figure 2:
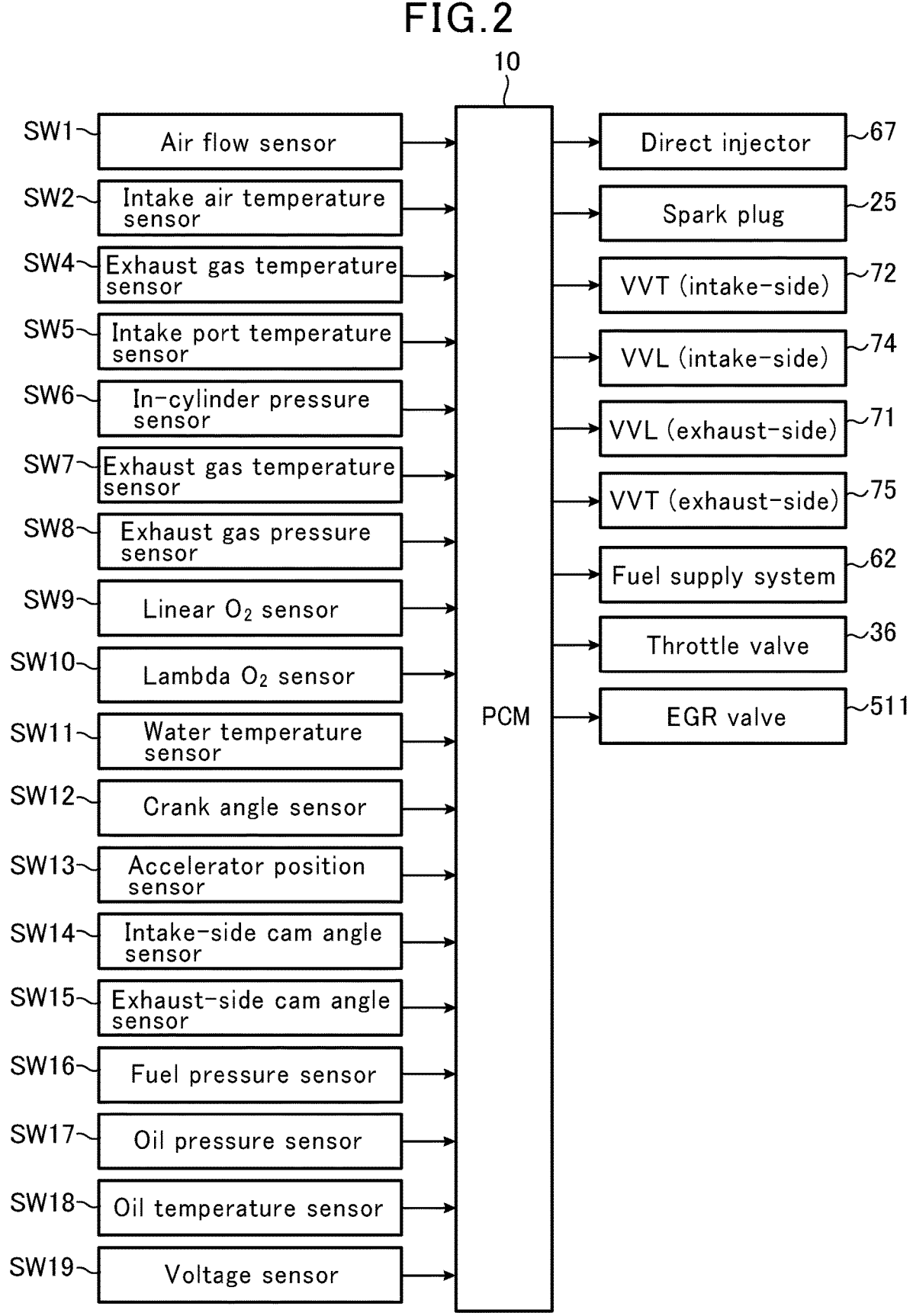
FIG. 2 is a block diagram depicting an electrical configuration regarding the engine fuel injection control device according to this embodiment.

FIG. 1 is a schematic diagram depicting a configuration of an engine (engine body) 1 employing the engine fuel injection control device according to this embodiment, and FIG. 2 is a block diagram depicting the engine fuel injection control device according to this embodiment.

The engine 1 is a gasoline engine which is mounted on a vehicle, and configured to be supplied with fuel containing at least gasoline and to perform compressed self-ignition (specifically, so-called "HCCI (Homogeneous-Charge Compression Ignition)"). The engine 1 comprises: a cylinder block 11 provided with a plurality of cylinders 18 (although FIG. 1 depicts only one cylinder, the cylinder block 11 is actually provided with a plurality of, e.g., four, cylinders, in an in-line arrangement); a cylinder head 12 disposed on the top of the cylinder block 11; and an oil pan 13 disposed under the cylinder block 11 and storing lubricant therein. Each of the cylinders 18 is provided with a piston 14 reciprocably fitted thereinto and connected to a crankshaft 15 via a connecting rod 142. The piston 14 has a top wall formed with a cavity 141 like a re-entrant type in a diesel engine. The cavity 141 is configured to be opposed to an aftermentioned fuel injector 67 when the piston 14 is located around top-dead-center of compression stroke. The cylinder head 12, the cylinder 18, and the piston 14 having the cavity 141 define a combustion chamber 19. The shape of the combustion chamber 19 is not limited to the shape depicted in FIG. 1. For example, the shape of the cavity 141, the shape of a top surface of the piston 14, the shape of a ceiling of the combustion chamber 19 and the like may be appropriately changed.

With a view to improvement in theoretical thermal efficiency, stabilization of aftermentioned compression ignition combustion, and others, the engine 1 is configured to have a relatively high geometrical compression ratio of 15 or more. It is to be noted that the geometrical compression ratio may be appropriately set in the range of about 15 to 20.

The cylinder head 12 is formed with an intake port 16 and an exhaust port 17, with respect to each of the cylinders 18. The intake port 16 and the exhaust port 17 are provided, respectively, with an intake valve 21 and an exhaust valve 22 for opening and closing respective openings of the intake and exhaust ports 16, 17 on the side of the combustion chamber 19.

In two valve driving systems for driving the intake valve 21 and the exhaust valve 22, respectively, the exhaust valve driving system is provided with: a variable valve lift mechanism (see FIG. 2; hereinafter referred to as "VVL") 71, for example, of a hydraulically-actuated type, which is operable to switch an operation mode of the exhaust valve 22 between a normal mode and a special mode; and a phase variable mechanism (variable valve timing mechanism) (hereinafter referred to as "VVT") 75 capable of changing a rotational phase of an exhaust camshaft with respect to the crankshaft 15. Although depiction of its detailed configuration is omitted, the VVL 71 is constructed such that it comprises: two types of cams having different cam profiles, i.e., a first cam having one cam lobe and a second cam having two cam lobes; and a cam shifting mechanism for selectively transmitting an operation state of one of the first and second cams to the exhaust valve 22. In this example, when the operation state of the first cam is transmitted to the exhaust valve 22, the exhaust valve 22 operates in the normal mode in which the exhaust valve 22 is opened only once in exhaust stroke, whereas, when the operation state of the second cam is transmitted to the exhaust valve 22, the exhaust valve 22 operates in the special mode in which the exhaust valve 22 is opened not only in exhaust stroke but also in intake stroke, i.e., so-called "exhaust double-opening" is performed. The normal mode and the special mode in the VVL 71 are switched according to an operation state of the engine. Specifically, the special mode is used in control of internal EGR. It is to be noted that an electromagnetically-driven type valve driving system for driving the exhaust valve 22 by an electromagnetic actuator may be employed, instead of the hydraulically-actuated type valve driving system.

The VVT 75 may be constructed by appropriately employing a heretofore-known hydraulic, electromagnetic or mechanical structure, and thus depiction of its detailed configuration will be omitted. The VVT 75 is configured to control the exhaust valve 22 such that each of a valve-opening timing and a valve-closing timing thereof continuously changes within a given range. Further, the VVL 71 and the VVT 75 may be configured to control the exhaust valves 22 each provided in a respective one of the plurality of cylinders 18, individually with respect to each of the cylinders 18, in terms of a lift amount and an operation timing.

It is to be noted that a means to realize the internal EGR is not limited to only the aforementioned double-opening of the exhaust valve 22. For example, the internal EGR control may be performed by so-called "intake double-opening" which is operation of opening the intake valve 21 two times, or by providing a negative overlap period in which both of the intake valve 21 and the exhaust valve 22 are closed during an exhaust stroke to a subsequent intake stroke, to cause burned gas to remain in the cylinder 18.

As with the exhaust valve driving system provided with the VVL 71 and the VVT 75, the intake valve driving system is provided with a VVL 74 and a VVT 72, as depicted in FIG. 2. The intake-side VVL 74 is different from the exhaust-side VVL 71. For example, the intake-side VVL 74 is constructed such that it comprises: two types of cams having different cam profiles, i.e., a large lift cam capable of enabling the intake valve 21 to have a relatively large lift amount, and a small lift cam capable of enabling the intake valve 21 to have a relatively small lift amount; and a cam shifting mechanism for selectively transmitting an operation state of one of the large and small lift cams to the intake valve 21. In this example, when the VVL 74 is transmitting the operation state of the large lift cam to the intake valve 21, the intake valve 21 is opened with the relatively large lift amount and a valve-open period of the intake valve 21 is also extended. On the other hand, when the VVL 74 is transmitting the operation state of the small lift cam to the intake valve 21, the intake valve 21 is opened with the relatively small lift amount and the valve-open period of the intake valve 21 is also reduced. The intake-side VVL 74 is configured such that the large lift cam and the small lift cam are switched therebetween to provide the same valve-closing or valve-opening timing.

As with the exhaust-side VVT 75, the intake-side VVT 72 may be constructed by appropriately employing a heretofore-known hydraulic, electromagnetic or mechanical structure, and thus depiction of its detailed configuration will be omitted. The intake-side VVT 72 is configured to control the intake valve 21 such that each of the valve-opening timing and the valve-closing timing thereof continuously changes within a given range. Further, the VVL 74 and the VVT 72 may be configured to control the intake valves 21 each provided in a respective one of the plurality of cylinders 18, individually with respect to each of the cylinders 18, in terms of the lift amount and the operation timing. Alternatively, in the intake valve driving mechanism, only the VVT 72 may be employed to change only the valve-opening timing and the valve-closing timing of the intake valve 21, without employing the VVL 74.

With respect to each of the cylinders 18, the cylinder head 12 is provided with a solenoid-type fuel injector 67 for directly injecting fuel into the cylinder 18. For example, the fuel injector 67 is configured such that it is opened by initially applying a given voltage thereto, and subsequently the valve open state is held by continuing to apply a given current (holding current) (the application of the initial voltage is stopped after applying the holding current). The fuel injector 67 is disposed such that a nozzle hole thereof faces inside the combustion chamber 19, from a central region of a ceiling surface of the combustion chamber 19. The fuel injector 67 is operable to directly inject, into the combustion chamber 19, fuel at a fuel injection timing set according to the operation state of the engine 1 and in an amount according to the operation state of the engine 1. In this example, the fuel injector 67 is a multi-hole injector having a plurality of nozzle holes, although its detailed depiction will be omitted. Thus, the fuel injector 67 is operable to inject fuel such that fuel mist spreads in a radial pattern from a central position of the combustion chamber 19. Fuel mist injected at a timing when the piston 14 is located around top-dead-center of compression stroke, in such a manner as to spread in a radial pattern from the central position of the combustion chamber 19, flows along a wall surface of the cavity 141 formed in the top wall of the piston. This can be rephrased as follows: The cavity 141 is formed such that it can receive therein fuel mist injected at a timing when the piston 14 is located around top-dead-center of compression stroke. A combination of this multi-hole fuel injector 67 and the cavity 141 is an advantageous configuration usable as a means to shorten an air-fuel mixture forming period after fuel injection and shorten a combustion period. It is to be noted that the fuel injector 67 is not limited to the multi-hole fuel injector, but may be an injector of an outward lifting valve type.

A non-depicted fuel tank and the fuel injector 67 are connected therebetween by a fuel supply line. In the fuel supply line, a fuel supply system 62 is inserted which comprises a fuel pump 63 and a common rail 64 and is capable of supplying fuel to the fuel injector 67 at a relatively high fuel pressure. The fuel pump 63 is capable of pumping fuel from the fuel tank to the common rail 64, and the common rail 64 is capable of storing the pumped fuel at a relatively high fuel pressure. In response to opening of the fuel injector 67, fuel stored in the common rail 64 is injected from the nozzle holes of the fuel injectors 67. Although depiction is omitted, the fuel pump 63 is a plunger pump, which is configured to be driven by the engine 1. The fuel supply system 62 comprising the engine-driven pump enables fuel having a high fuel pressure of 30 MPa or more to be supplied to the fuel injector 67. The fuel pressure may be set to about 120 MPa at a maximum. The pressure of fuel to be supplied to the fuel injector 67 is changed according to the operation state of the engine 1. It is to be noted that the fuel supply system 62 is not limited to this configuration.

The cylinder head 12 is also provided with a spark plug 25 for forcibly igniting (specifically, spark-igniting) an air-fuel mixture in the combustion chamber 19. In this example, the spark plug 25 is disposed to penetrate through the cylinder head 12 in such a manner as to extend obliquely downwardly from an exhaust side of the engine 1. Further, the spark plug 25 is disposed such that a distal end thereof faces inside the cavity 141 of the piston 14 when the piston 14 is located at top-dead-center of compression stroke.

As depicted in FIG. 1, an intake passage 30 is connected to one of opposite lateral surfaces of the engine 1 to communicate with the intake port 16 in each of the cylinders 18. On the other hand, an exhaust passage 40 for discharging burned gas (exhaust gas) from the combustion chamber 19 in each of the cylinders 18 is connected to the other lateral surface of the engine 1.

The intake passage 30 is provided with an air cleaner 31 for filtering intake air, at an upstream end thereof, and a throttle valve 36 for adjusting an amount of intake air to each of the cylinders 18, on a downstream side of the air cleaner 31. The intake passage 30 is further provided with a surge tank 33, at a position adjacent to a downstream end of the intake passage 30. A part of the intake passage 30 located downstream of the surge tank 33 is formed as a plurality of independent passages each branched with respect to a respective one of the cylinders 18. Each of the independent passages has a downstream end connected to a respective one of the intake ports 16 of the cylinders 18.

An upstream part of the exhaust passage 40 is formed as an exhaust manifold which comprises: a plurality of independent passages each branched with respect to a respective one of the cylinders 18 and each connected to an outer end of a respective one of the exhaust ports 17; and a collector portion in which the independent passages are collected together. At a position downstream of the exhaust manifold, the exhaust passage 40 is connected with a direct catalyst 41 and an underfoot catalyst 42 each serving as an exhaust gas purification device for purifying harmful components contained in exhaust gas. Each of the direct catalyst 41 and the underfoot catalyst 42 is constructed such that it comprises a tubular casing, and a catalyst such as three-way catalyst, disposed in a flow passage inside the casing.

A region of the intake passage 30 located between the surge tank 33 and the throttle valve 36 and a region of the exhaust passage 40 located upstream of the direct catalyst 41 are connected to each other via an EGR passage 50 for recirculating part of exhaust gas to the intake passage 30. The EGR passage 50 comprises a main passage 51 provided with an EGR cooler 52 for cooling exhaust gas (external EGR gas) by engine cooling water. The main passage 51 is provided with an EGR valve 511 for adjusting a recirculation amount of exhaust gas to the intake passage 30.

The engine 1 is configured to be controlled by a powertrain control module (hereinafter referred to as "PCM") 10. The PCM 10 is composed of a microprocessor comprising a CPU, a memory, a counter timer group, an interface, and paths connecting these units. This PCM 10 forms a controller.

As depicted in FIGS. 1 and 2, the PCM 10 is configured to receive an input of detection signals of various sensors SW1, SW2, SW4 to SW18. Specifically, the PCM 10 is configured to receive an input of: a detection signal of an air flow sensor SW1 disposed downstream of the air cleaner 31 and operable to detect a flow rate of fresh air; a detection signal of an intake air temperature sensor SW2 disposed downstream of the air cleaner 31 and operable to detect a temperature of fresh air; a detection signal of an EGR gas temperature sensor SW4 disposed around a connection region of the EGR passage 50 with respect to the intake passage 30 and operable to detect a temperature of external EGR gas; a detection signal of an intake port temperature sensor SW5 attached to the intake port 16 and operable to detect a temperature of intake air just before flowing into the cylinder 18; a detection signal of an in-cylinder pressure sensor SW6 attached to the cylinder head 12 and operable to detect an internal pressure (in-cylinder pressure) of the cylinder 18; detection signals of an exhaust gas temperature sensor SW7 and an exhaust gas pressure sensor SW8 each disposed around a connection region of the exhaust passage 40 with respect to the EGR passage 50 and operable to detect a temperature and a pressure of exhaust gas, respectively; a detection signal of a linear $O_2$ sensor SW9 disposed upstream of the direct catalyst 41 and operable to detect a concentration of oxygen contained in exhaust gas; a detection signal of a lambda $O_2$ sensor SW10 disposed between the direct catalyst 41 and the underfoot catalyst 42 and operable to detect the concentration of oxygen in exhaust gas; a detection signal of a water temperature sensor SW11 operable to detect a temperature of engine cooling water; a detection signal of a crank angle sensor SW12 operable to detect a rotational angle of the crankshaft 15; a detection signal of an accelerator position sensor SW13 operable to detect an accelerator position corresponding to an amount of manipulation (depression) of an accelerator pedal (not depicted) of a vehicle equipped with the engine 1; detection signals of intake-side and exhaust-side cam angle sensors SW14, SW15; a detection signal of a fuel pressure sensor SW16 attached to the common rail 64 of the fuel supply system 62 and operable to detect a pressure of fuel to be supplied to the fuel injector 67; a detection signal of an oil pressure sensor SW17 operable to detect a pressure of engine oil of the engine 1; a detection signal of an oil temperature sensor SW18 operable to detect a temperature of engine oil of the engine 1; and a detection signal of a voltage sensor SW19 operable to detect a voltage across a solenoid (hereinafter referred to appropriately as "solenoid voltage") of the fuel injector 67. The voltage sensor SW19 may be provided somewhere on a connection line extending from the PCM 10 to the solenoid of the fuel injector 67 so as to supply a control signal for driving the solenoid.

The PCM 10 is operable to perform various calculations based on the above detection signals to thereby determine states of the engine 1 and the vehicle, and output control signals, respectively, to actuators of the fuel injector 67, the spark plug 25 and 26, the intake-side VVT 72, the intake-side VVL 74, the exhaust-side VVT 75, the exhaust-side VVL 71, the fuel supply system 62, and the various valves (the throttle valve 36, the EGR valve 511, etc.). In this way, the PCM 10 controls the operation of the engine 1. In this embodiment, the PCM 10 functions as the "engine fuel injection control device" of the present invention, to perform control, particularly, for the fuel injector 67. Specifically, the PCM 10 is equivalent to "controller" set forth in the appended claims.

<Operation Range>

Figure 3:
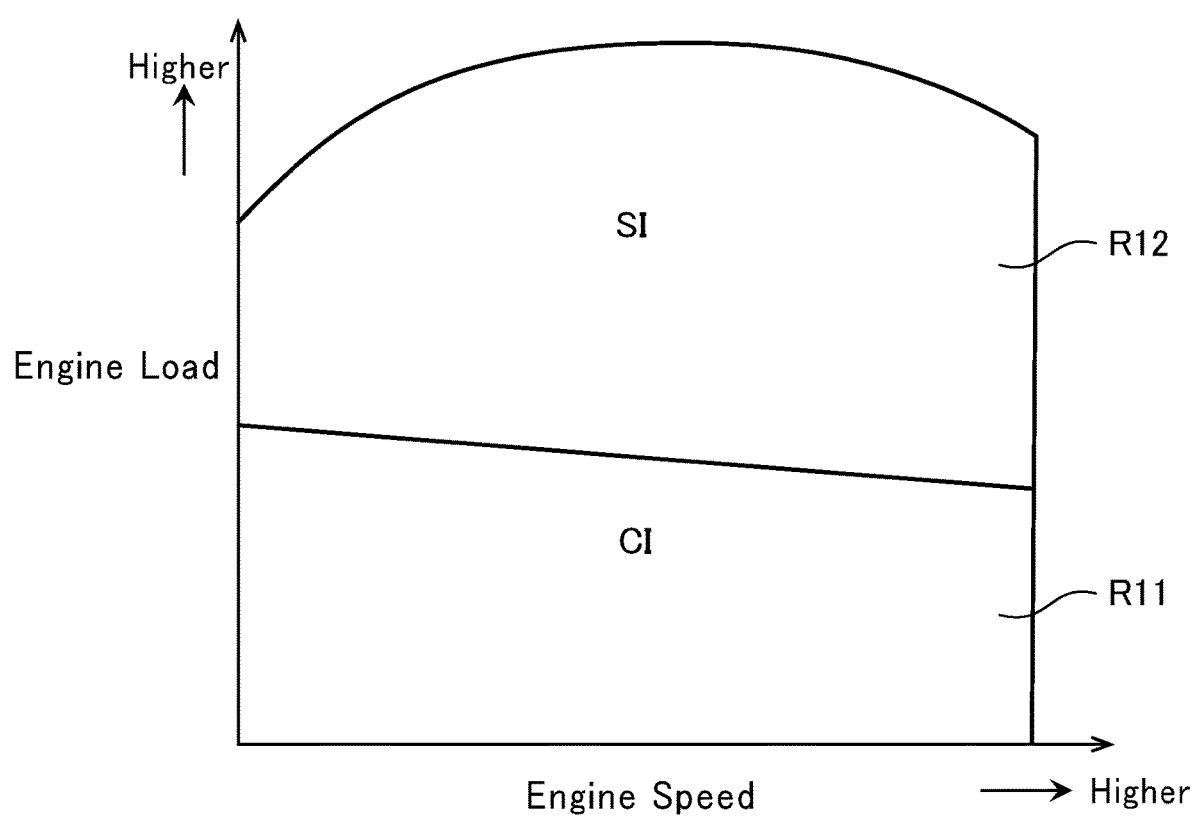
FIG. 3 is an explanatory graph of an engine operation region in this embodiment.

Next, with reference to FIG. 3, an operation range of the engine in this embodiment will be described. FIG. 3 depicts one example of an operation control map of the engine 1. With a view to improvements in fuel economy and exhaust emission performance, in a first operating range R11 which is a low load range where engine load is relatively low, the engine 1 performs compression-ignition combustion triggered by compression self-ignition, instead of ignition by the spark plug 25. However, as the engine load of the engine 1 becomes higher, the compression ignition combustion gradually causes excessively rapid combustion, leading to occurrence of combustion noise and difficulty in control of ignition timing (leading to a tendency for occurrence of misfire or the like). Therefore, in a second operation range R12 which is a high load range where the engine load is relatively high, the engine 1 performs forced-ignition combustion (in this embodiment, spark-ignition combustion) using the spark plug 25, instead of the compression-ignition combustion. As above, the engine 1 is configured to switch between a CI (Compression-Ignition) operation in which the engine 1 is operated by the compression-ignition combustion, and an SI (Spark-Ignition) operation, i.e., engine operation based on the spark-ignition combustion, according to the engine operating state, particularly, the engine load.

<Split Injection>

Figure 4:
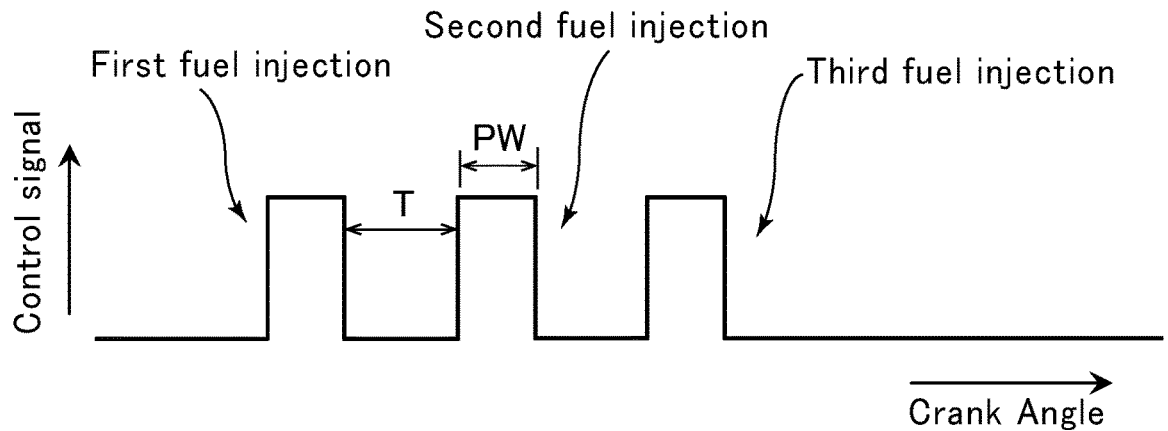
FIG. 4 is an explanatory chart of split injection in this embodiment.

With reference to FIG. 4, a split injection in this embodiment will be described. In FIG. 4, crank angle is indicated in a horizontal direction, and a control signal (i.e., a drive signal, which is expressed by voltage and/or current) to be supplied from the PCM 10 to the fuel injector 67 is indicated in a vertical direction. In FIG. 4, the reference sign T denotes an interval between adjacent fuel injections (injection interval) during split injection. This injection interval T corresponds to a time after completion of a previous fuel injection through until start of the subsequent fuel injection (basically, expressed in crank angle). Further, the reference sign PW denotes a pulse width of the control signal (pulse signal) to be supplied from the PCM 10 to the fuel injector 67. This pulse width PW corresponds to a valve-open period of the fuel injector 67. The valve-open period is also referred to as "ineffective injection period"

In the example depicted in FIG. 4, the PCM 10 is operable to control the fuel injector 67 to perform fuel injection in three-split manner, i.e., in three stages. For example, the PCM 10 is operable, in the operation range R11 where the CI operation is performed, to carry out the split injection in such a manner as to achieve the effect of forming a homogenous air-fuel mixture to ensure ignitability, and others. and, in the operation range R12 where the SI operation is performed, to carry out the split injection in such a manner as to achieve the effect of suppressing abnormal combustion (particularly, preignition which is a phenomenon that an air-fuel mixture is self-ignited before an ignition timing), and others. In this case, the PCM 10 is operable to carry out the sprit injection across an intake stroke and the subsequent compression stroke. Although FIG. 4 depicts an example in which fuel injection is performed in the form of three-stage split injection, the present invention is not limited to performing the three-stage split injection, but may perform two-stage split injection or four or more-stage split injection.

<Fuel Injection Control>

Next, a fuel injection control to be executed with respect to the fuel injector 67 by the PCM 10 in this embodiment will be described. In this embodiment, the PCM 10 is operable to execute the fuel injection control with respect to the fuel injector 67, based on a residual magnetism (which is equivalent to a residual voltage) having occurred in the solenoid of the fuel injector 67. Thus, first of all, a residual voltage occurring in the solenoid of the fuel injector 67 will be described with reference to FIGS. 5 to 8.

Figure 5:
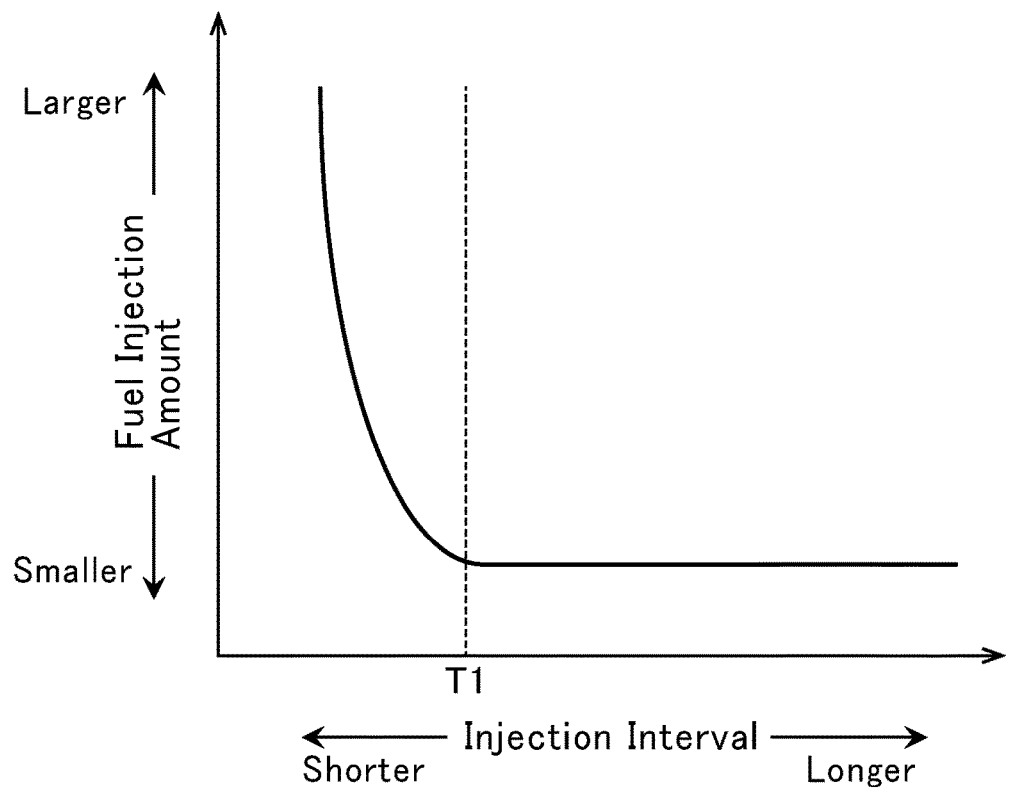
FIG. 5 is a graph presenting a relationship between an injection interval and a fuel injection amount.

FIG. 5 depicts a relationship between an injection interval between fuel injections from the fuel injector 67 (horizontal axis) and a fuel injection amount from the fuel injector 67 (vertical axis). More specifically, the injection interval on the horizontal axis indicates an interval between the first fuel injection and the second fuel injection, and the fuel injection amount on the vertical axis indicates an amount of fuel injected in the second fuel injection. FIG. 5 shows that, as the interval between the first fuel injection and the second fuel injection becomes shorter, more specifically, as the injection interval becomes shorter in a rage where the injection interval is equal to or less than a given value T1 (e.g., 3 msec), the fuel injection amount in the second fuel injection gradually increases.

This phenomenon is considered to be caused by a residual magnetism (i.e., residual magnetic flux) having occurred in the solenoid of the fuel injector 67 during the first fuel injection, as described above. That is, it is considered that, during the first fuel injection, a residual magnetism occurs in the solenoid of the fuel injector 67, and thereby in the second fuel injection, a response speed of the fuel injector 67 is increased, leading to a situation where the second fuel injection is started at a timing earlier than an instructed timing, and the fuel injection amount is increased by an amount corresponding to premature valve-opening of the fuel injector 67. In particular, it is considered that, as the injection interval between fuel injections becomes shorter, the residual magnetism in the solenoid of the fuel injector 67 becomes larger, so that the second fuel injection is started much earlier, and thus the fuel injection amount is much more increased.

Here, it is difficult to actually measure the above residual magnetism in the solenoid of the fuel injector 67. The inventors of the present invention have found that a voltage across the solenoid of the fuel injector 67 changes according to the residual magnetism in the solenoid. This voltage across the solenoid can be easily detected by providing the voltage sensor SW19 on the connection line between the PCM 10 and the solenoid of the fuel injector 67. Therefore, the fuel injection control device according to this embodiment is configured to detect the residual voltage (solenoid voltage) corresponding to the residual magnetism by using the voltage sensor SW19, and perform the fuel injection control with respect to the fuel injector 67, based on the detected residual voltage.

Figure 6:
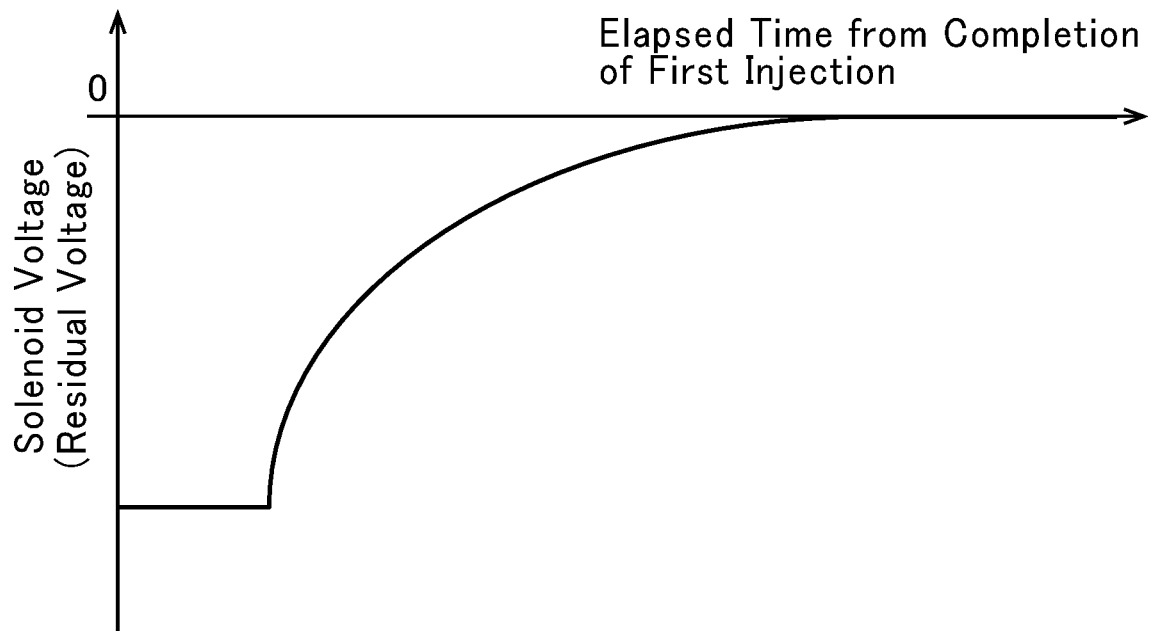
FIG. 6 is a graph presenting a relationship between an elapsed time from completion of first fuel injection, and a residual voltage (solenoid voltage).

Next, FIG. 6 depicts a relationship between an elapsed time from completion of the first fuel injection (horizontal axis), and the solenoid voltage corresponding to the residual voltage, detected by the voltage sensor SW19 (vertical axis). As depicted in FIG. 6, after completion of the first fuel injection, i.e., after completion of application of current to the solenoid so as to close the fuel injector 67, the residual voltage occurs in the solenoid of the fuel injector 67. This residual voltage in the solenoid is detected as a negative value by the voltage sensor SW19. The residual voltage of the solenoid corresponds to energy stored in the coil, represented by a general formula "½ L I$^2$" (where "I" denotes current, and "L" denotes inductance of the coil). Further, an initial value of the residual voltage corresponds to a current value in the solenoid of the fuel injector 67, just before completion of current application to the solenoid. Basically, the current value at this time is maintained approximately at a constant value, and thus the initial value of the residual voltage is also maintained approximately at a constant value. However, it can be changed due to aging and an individual difference of the fuel injector 67, and a change in pressure of fuel to be supplied to the fuel injector 67.

Further, as depicted in FIG. 6, the residual voltage in the solenoid is maintained at a constant value for a certain period of time. However, after the elapse of the certain period of time, it is gradually attenuated over time. In this process, the residual voltage in the solenoid is gradually attenuated in accordance with a given exponential function. Although this exponential function is basically uniquely determined, it can also be changed due to an individual difference, a temperature characteristic, aging and others of the fuel injector 67. In one example, the residual voltage in the solenoid becomes 0 after the elapse of about 5 msec since completion of the first fuel injection.

Because of this relationship between the elapsed time from the first fuel injection and the residual voltage, in the case where the injection interval between the first fuel injection and the second fuel injection is relatively short, the residual voltage at a timing of triggering the second fuel injection is relatively large, so that the fuel injection timing and the fuel injection amount in the second fuel injection are influenced by the residual voltage. Moreover, as the injection interval becomes shorter, the residual voltage at the timing of triggering the second fuel injection becomes larger, leading to an increase in degree of influence of the residual voltage on the fuel injection timing and the fuel injection amount in the second fuel injection. On the other hand, in the case where the injection interval between the first fuel injection and the second fuel injection is relatively long, the residual voltage becomes 0 at start of the second fuel injection, so that the fuel injection timing and the fuel injection amount in the second fuel injection become free of the influence of the residual voltage.

The fuel injection control device according to this embodiment is configured to derive a characteristic of a temporal change (attenuation characteristic) of the residual voltage in the solenoid of the fuel injector 67, as depicted in FIG. 6, based on the detection signal of the voltage sensor SW19. For example, the fuel injection control device is operable to obtain the detection signal of the voltage sensor SW19 at given time intervals, and derive the attenuation characteristic of the residual voltage based on the detection signal, as needed.

Figure 7:
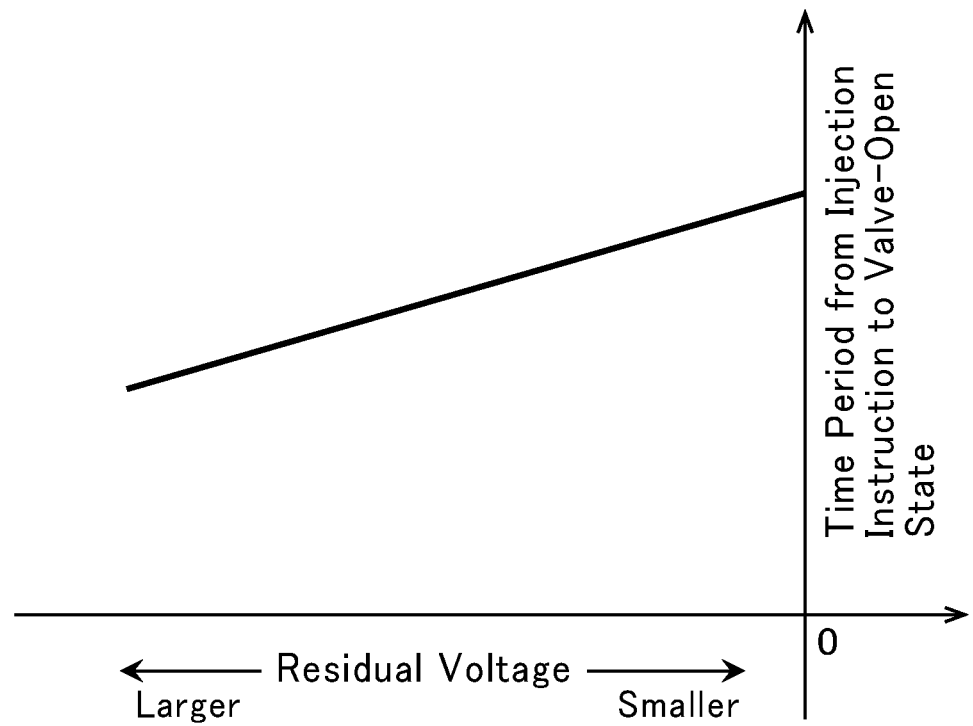
FIG. 7 is a graph presenting a relationship between the residual voltage, and a time period after issuing an injection instruction through until a fuel injector is opened.

Next, FIG. 7 depicts a relationship between the residual voltage in the solenoid of the fuel injector 67 (horizontal axis), and a time period after issuing an injection instruction to the fuel injector 67 (from a timing when the control signal is supplied to the fuel injector 67) through until the fuel injector 67 is actually opened (vertical axis). In this graph, the residual voltage is presented as a negative value. As depicted in FIG. 7, as the residual voltage (absolute value) in the solenoid becomes larger, the fuel injector 67 is opened earlier, i.e., the fuel injection from the fuel injector 67 is stated at an earlier timing. This is because, as the residual voltage (absolute value) in the solenoid at the timing of issuance of the injection instruction becomes larger, a response speed of the fuel injector 67 is gradually increased. When the fuel injector 67 is prematurely opened as mentioned above, the fuel injection amount will be increased by an amount corresponding to the premature valve-opening of the fuel injector 67.

Figure 8:
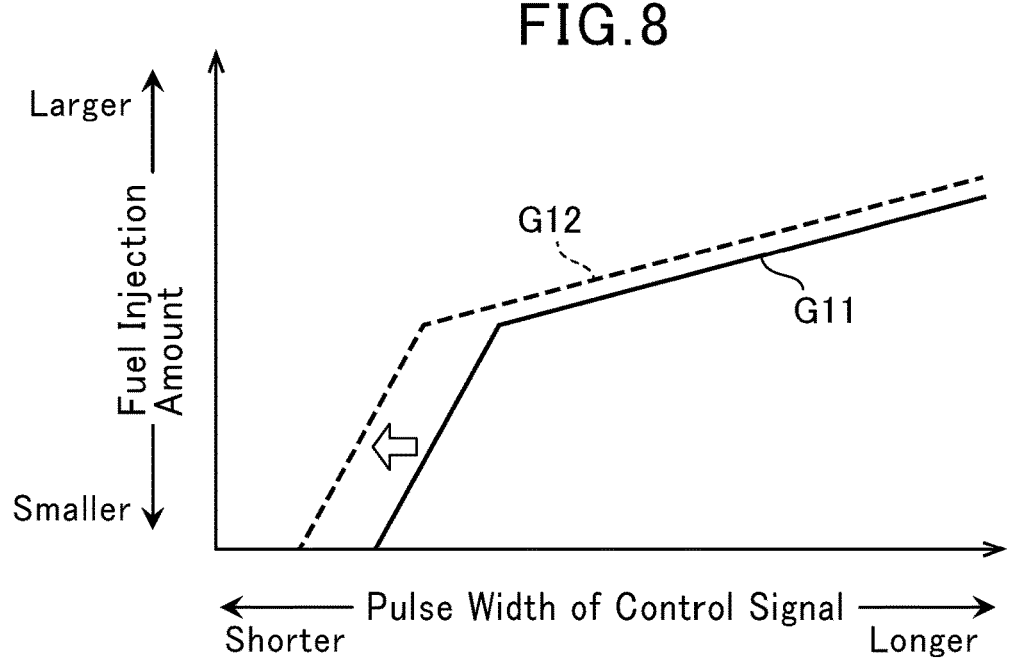
FIG. 8 is a graph presenting a relationship between a pulse width of a control signal to be supplied to the fuel injector, and the fuel injection amount.

Next, FIG. 8 depicts a relationship between a pulse width of the control signal to be supplied to the solenoid of the fuel injector 67 (horizontal axis), and the fuel injection amount from the fuel injector 67 (vertical axis). In FIG. 8, a line G11 indicates the relationship between the pulse width and the fuel injection amount, regarding the first fuel injection, and a line G12 indicates the relationship between the pulse width and the fuel injection amount, regarding the second fuel injection. Specifically, the line G12 indicates the relationship between the pulse width of the control signal and the fuel injection amount, in the case where the injection interval between the first fuel injection and the second fuel injection is relatively short (i.e., in the case where the residual voltage having occurred in the solenoid during the first fuel injection exerts an influence on the second fuel injection). The pulse width of the control signal represented on the horizontal axis corresponds to the valve-open period of the fuel injector 67. As depicted in FIG. 8, basically, as the pulse width of the control signal becomes longer, i.e., as the valve-open period of the fuel injector 67 becomes longer, the fuel injection amount is gradually increased in an approximately linear pattern. More specifically, when the pulse width of the control signal becomes equal to or greater than a given value, a change rate of the fuel injection amount with respect to the pulse width (a slope of the line) becomes gentler than when the pulse width of the control signal is less than the given value.

Further, as depicted in FIG. 8, the line G12 indicating the relationship between the pulse width of the control signal and the fuel injection amount regarding the second fuel injection is totally shifted (specifically, translated) leftwardly, with respect to the line G11 indicating the relationship between the pulse width and the fuel injection amount regarding the first fuel injection. This shows that, when the same pulse width is applied to the first and second fuel injections, the fuel injection amount in the second fuel injection becomes larger than the fuel injection amount in the first fuel injection (in other words, when the first and second fuel injections are performed to inject fuel in the same amount, the pulse width in the second fuel injection becomes shorter than the pulse width in the first fuel injection. This is because the injection interval between the first fuel injection and the second fuel injection is relatively short, and thereby the residual voltage in the solenoid at the timing of triggering the second fuel injection is relatively large, so that, in the second fuel injection, the fuel injector 67 is prematurely opened, and the fuel injection amount is increased by an amount corresponding to the premature valve-opening of the fuel injector 67.

In this embodiment, in the case where the injection interval between the first fuel injection and the second fuel injection is relatively short, specifically, in the case where the residual voltage having occurred in the solenoid during the first fuel injection exerts an influence on the second fuel injection, the relationship between the pulse width of the control signal to be supplied to the fuel injector 67 and the fuel injection amount from the fuel injector 67 (see the line G12) is preliminarily obtained and stored in the PCM 10. Then, the PCM 10 is operable to derive, based on the above relationship, a value of the pulse width of the control signal corresponding to a desired fuel injection amount (required fuel injection amount) in the second fuel injection, and to apply the derived pulse width to the fuel injector 67, so as to obtain the desired fuel injection amount. For example, the relationship between the pulse width of the control signal and the fuel injection amount is preliminarily obtained, with respect to each of various injection intervals, and the PCM 10 is configured to select, among a plurality of the relationships, one relationship corresponding to an actual value of the injection interval between the first injection and the second injection, and derive, based on the selected relationship, a value of the pulse width of the control signal corresponding to a desired fuel injection amount. In this case, the PCM 10 is operable to apply, to the second fuel injection, a pulse width obtained by performing correction to shorten an original pulse width (an initial pulse width of the control signal corresponding to the desired fuel injection amount).

Figure 9:
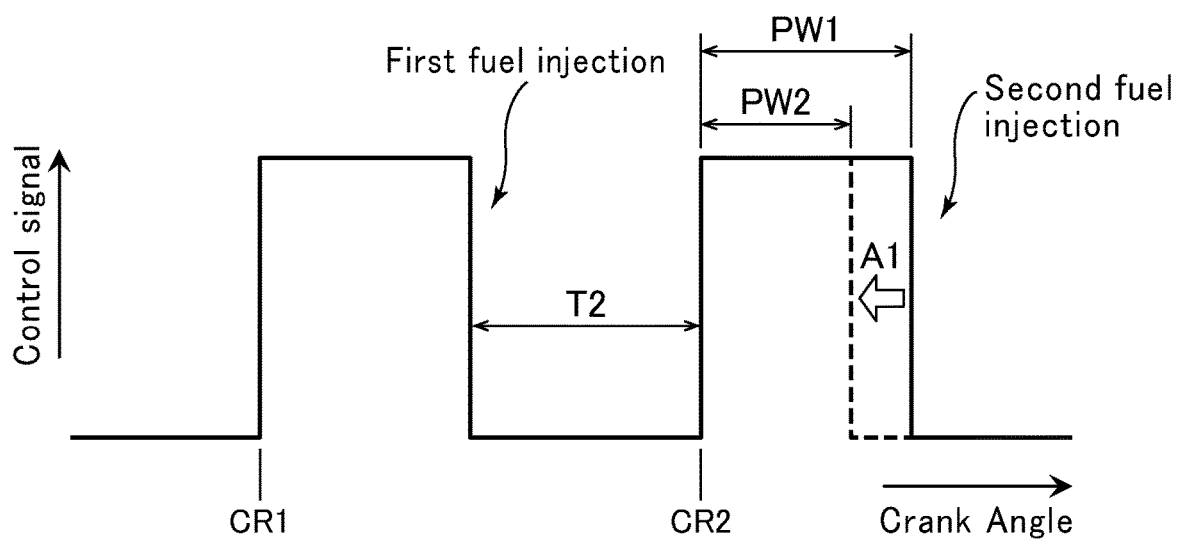
FIG. 9 is an explanatory chart of a basic concept of the fuel injection control in this embodiment.

Next, with reference to FIG. 9, a basic concept of the fuel injection control in this embodiment will be more specifically described. In FIG. 9, crank angle is indicated in the horizontal direction, and the control signal (pulse signal) to be supplied from the PCM 10 to the fuel injector 67 is indicated in the vertical direction. As depicted in FIG. 9, in this embodiment, the PCM 10 is operable, when the injection interval T2 between the first fuel injection and the second fuel injection is less than a given time period (e.g., a time period corresponding to the given value T1 in FIG. 5), to apply, to the second fuel injection, a pulse width PW2 obtained by performing correction to shorten an original pulse width PW1 of the control signal (see the arrowed line A1). Performing correction to shorten the pulse width of the control signal in the above manner corresponds to shortening the valve-open period of the fuel injector 67. In this case, the PCM 10 is configured to perform only the correction for shortening the pulse width of the control signal to be applied to the second fuel injection, while fixing a timing of starting the second fuel injection (i.e., a timing of opening the fuel injector 67 in the second fuel injection).

More specifically, in this embodiment, the PCM 10 is operable to derive an attenuation characteristic of the residual voltage in the solenoid of the fuel injector 67 (see FIG. 6), from the solenoid voltage detected by the voltage sensor SW19, and to estimate the residual voltage at the timing of triggering the second fuel injection, based on the derived attenuation characteristic, and determine the pulse width PW2 to be applied to the second fuel injection, based on the estimated residual voltage. In one example, the relationship between the pulse width of the control signal and the fuel injection amount is preliminarily defined in the form of a map (e.g., a map like the line G12 depicted in FIG. 8 is preliminarily defined), with respect to each of various residual voltages at the timing of triggering the second fuel injection, based on an attenuation characteristic of the residual voltage or the like, and the PCM 10 is configured to select, among a plurality of the maps, one map corresponding to an actual value of the residual voltage at the timing of triggering the second fuel injection (the actual residual voltage may be the estimated residual voltage, or may be the residual voltage detected by the voltage sensor SW19), and derive, based on the selected map, a value of the pulse width of the control signal corresponding to a desired fuel injection amount to be realized. In another example, the relationship between the pulse width of the control signal and the fuel injection amount is preliminarily defined in the form of a map (e.g., a map like the line G12 is preliminarily defined), with respect to each of various injection intervals, based on an attenuation characteristic of the residual voltage or the like, and the PCM 10 is configured to select, among a plurality of the maps, one map corresponding to an actual value of the injection interval T2, and derive, based on the selected map, a value of the pulse width of the control signal corresponding to a desired fuel injection amount to be realized.

Further, in this embodiment, the PCM 10 is operable, with regard to the first fuel injection, to perform control of opening the fuel injector 67 based on a crank angle CR1, and, with regard to the second fuel injection, to perform control of opening the fuel injector 67 based on an elapsed time from completion of the first fuel injection, instead of a crank angle CR2. Each of these crank angles CR1, CR2 is a fuel injection start timing (timing of opening the fuel injector 67) set according to the operation state of the engine 1. More specifically, in this embodiment, the PCM 10 is operable, with regard to the first fuel injection, to monitor the crank angle detected by the crank angle sensor SW 12, and open the fuel injector 67 at a timing when the crank angle detected by the crank angle sensor SW 12 is coincident with the crank angle CR1, and, with regard to the second fuel injection, to count up time from the time of completion of the first fuel injection by using a timer, without referring to the crank angle detected by the crank angle sensor SW12, and open the fuel injector 67 at a timing when the count-up time reaches a time period corresponding to the injection period T2. In this case, the PCM 10 is operable, based on a current engine speed, to convert the crank angle CR2 at which the second fuel injection is to be started, into a time period from the time of completion of the first fuel injection (this time period corresponds to the injection interval T2), and perform control of opening the fuel injector 67, using this converted time period as a criterion time period.

The following description will be made about a specific example (first and second examples) of the fuel injection control in this embodiment.

First Example

Figure 10:
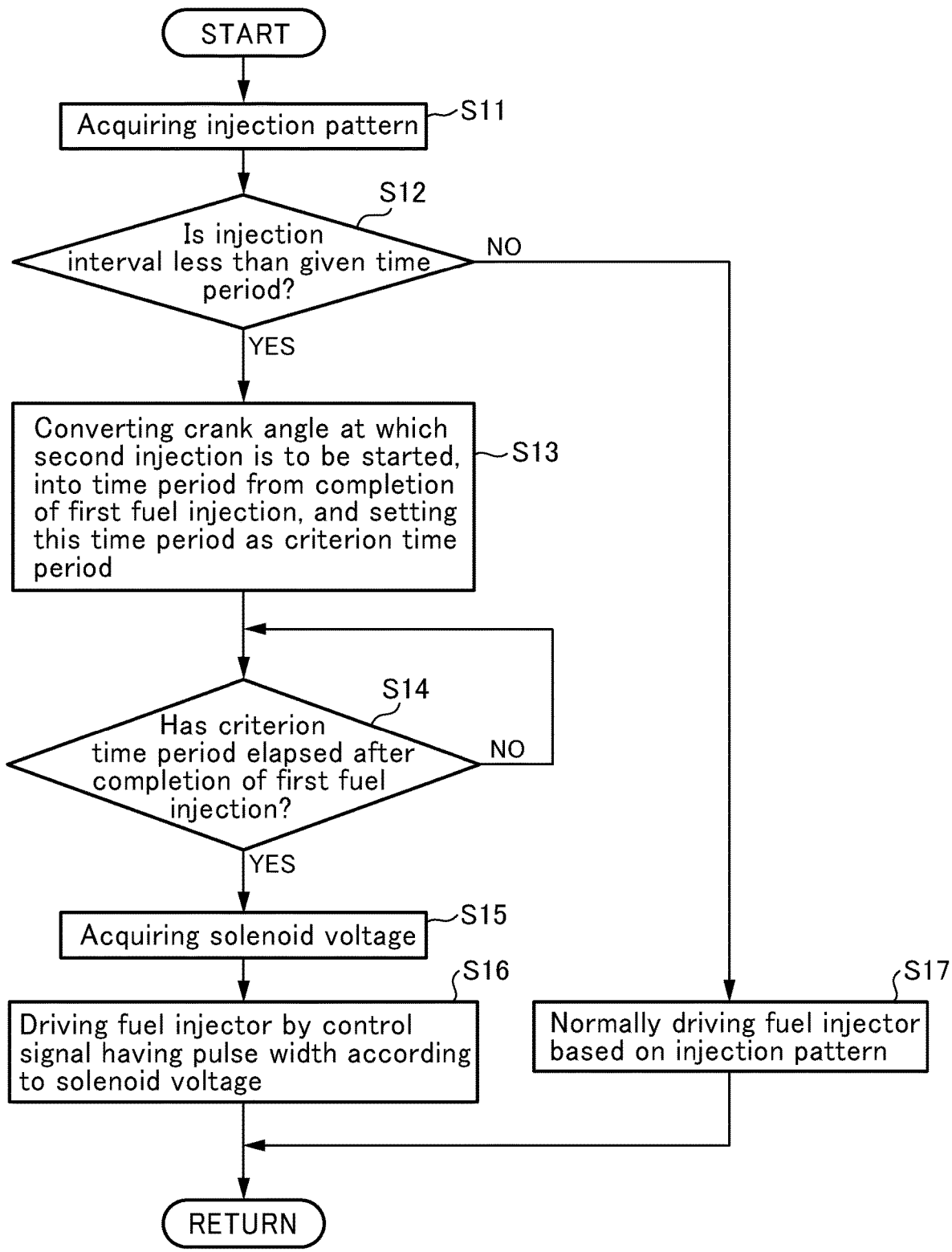
FIG. 10 is a flowchart presenting a first example of the fuel injection control in this embodiment.

With reference to FIG. 10, the first example of the fuel injection control in this embodiment will be described. FIG. 10 is a flowchart presenting the first example of the fuel injection control in this embodiment. This flow is repeatedly executed by the PCM 10.

First of all, in step S11, the PCM 10 operates to acquire an injection pattern for injecting fuel from the fuel injector 67 according to the operation state (engine speed, engine load, power output required by a driver, etc.) of the engine 1. In this injection pattern, various parameters such as the number of split fuel injections, the injection timing of each fuel injection, and the injection period (fuel injection amount) of each fuel injection are defined.

Subsequently, in step S12, the PCM 10 operates to obtain an injection interval between the first fuel injection and the second fuel injection, from the injection pattern acquired in the step S11, and determine whether or not the obtained injection interval is less than a given time period (e.g., this time period corresponds to the given value T1 in FIG. 5). Basically, the injection interval included in the injection pattern is defined by crank angles. Thus, in this case, the PCM 10 operates to convert the injection interval defined by crank angles, into a time period, based on a current engine speed, and perform the determination in the step S12 using the injection interval defined by the converted time period.

As a result of the determination in the step S12, when the injection interval is determined to be less than the given time period (step S12: YES), the processing routine proceeds to step S13. Differently, when the injection interval is not determined to be less than the given time period (step S12: NO), i.e., the injection interval is determined to be equal to or greater than the given time period, the processing routine proceeds to step S17. In this case, the residual voltage in the solenoid at the timing of triggering the second fuel injection becomes approximately 0, so that the fuel injection timing and the fuel injection amount in the second fuel injection are almost not influenced by the residual voltage. Therefore, in the step S17, the PCM 10 operates to drive the fuel injector 67 exactly in accordance with the injection pattern in a normal manner. That is, the PCM 10 operates to control the fuel injector 67 exactly in accordance with the fuel injection timing and the fuel injection period defined in the injection pattern, without correcting the pulse width of the control signal of the fuel injector 67 and converting the crank angle at which the fuel injection is to be started, into a time period.

Further, in the step S17, the PCM 10 operates to monitor the crank angle detected by the crank angle sensor SW 12, and operates, with regard to the first fuel injection, to open the fuel injector 67 at a timing when the crank angle detected by the crank angle sensor SW 12 is coincident with the crank angle CR1, and, with regard to the second fuel injection, to open the fuel injector 67 at a timing when the crank angle detected by the crank angle sensor SW 12 is coincident with the crank angle CR2. That is, the PCM 10 controls the second fuel injection on the basis of crank angles, instead of the elapsed time from completion of the first fuel injection.

Under conditions causing the routine to proceed to the step S17, the fuel injection timing and the fuel injection amount in the second fuel injection are almost not influenced by the residual voltage. Thus, in a normal manner, the fuel injection control is performed based on crank angles to execute the fuel injection at a desired piston position.

On the other hand, in the step S13, the PCM operates to convert the crank angle at which the second fuel injection is to be started (i.e., the crank angle at which the fuel injector 67 is to be opened for the second time), into a time period from completion of the first fuel injection, based on a current engine speed, and set this time period as a criterion time period. Subsequently, after completion of the first fuel injection, the PCM 10 operates to count up time from the time of completion of the first fuel injection by a timer, and, in step S14, the PCM 10 operates to determine whether or not the counted time reaches the criterion time period set in the step S13. That is, the PCM 10 operates to determine whether or not the criterion time period has elapsed after completion of the first fuel injection. As a result, when the criterion time period is determined to have elapsed after completion of the first fuel injection (step S14: YES), the processing routine proceeds to step S15. On the other hand, when the criterion time period is determined to not have elapsed after completion of the first fuel injection (step S14: NO), the processing routine returns to the step S14, and the PCM 10 will repeat the determination in the step S14 until the counted time reaches the criterion time period.

In step S15, the PCM 10 operates to acquire the solenoid voltage (residual voltage) of the fuel injector 67, detected by the voltage sensor SW19. Subsequently, in step S16, the PCM 10 operates to determine the pulse width of the control signal for the fuel injector 67, according to the solenoid voltage (residual voltage), and drive the fuel injector 67 by the control signal having the determined pulse width. For example, the relationship between the pulse width of the control signal and the fuel injection amount is preliminarily defined in the form of a map (e.g., a map like the line G12 is preliminarily defined), with respect to each of various residual voltages in the solenoid of the fuel injector 67, and the PCM 10 is configured to select, among a plurality of the maps, one map corresponding to the residual voltage acquired in the step S15, and employ, by referring to the selected map, a value of the pulse width of the control signal corresponding to the fuel injection amount (desired fuel injection amount) defined in the injection pattern.

In the flowchart in FIG. 10, the residual voltage in the solenoid is continually detected by the voltage sensor SW 19. Alternatively, the residual voltage in the solenoid may be detected at intervals of a given time period (at intervals of a certain level of time period). This is because the characteristic (attenuation characteristic) of the residual voltage in the solenoid of the fuel injector 67 remains almost unchanged, as mentioned above. In the case where the residual voltage is detected at intervals of a given time period, the detected residual voltage is utilized to derive the attenuation characteristic, and, instead of determining the pulse width of the control signal for the fuel injector 67 based on the residual voltage, the pulse width of the control signal for the fuel injector 67 may be determined based, for example, on the injection interval. In this case, the relationship between the pulse width of the control signal and the fuel injection amount is preliminarily defined (e.g., a map like the line G12 is preliminarily defined), with respect to each of various injection intervals between the first fuel injection and the second fuel injection, based on an attenuation characteristic of the residual voltage or the like. Then, among a plurality of the maps, one map corresponding to an actual value of the injection interval is selected, and a value of the pulse width of the control signal corresponding to the fuel injection amount (desired fuel injection amount) defined in the injection pattern may be employed by referring to the selected map.

Second Example

Figure 11:
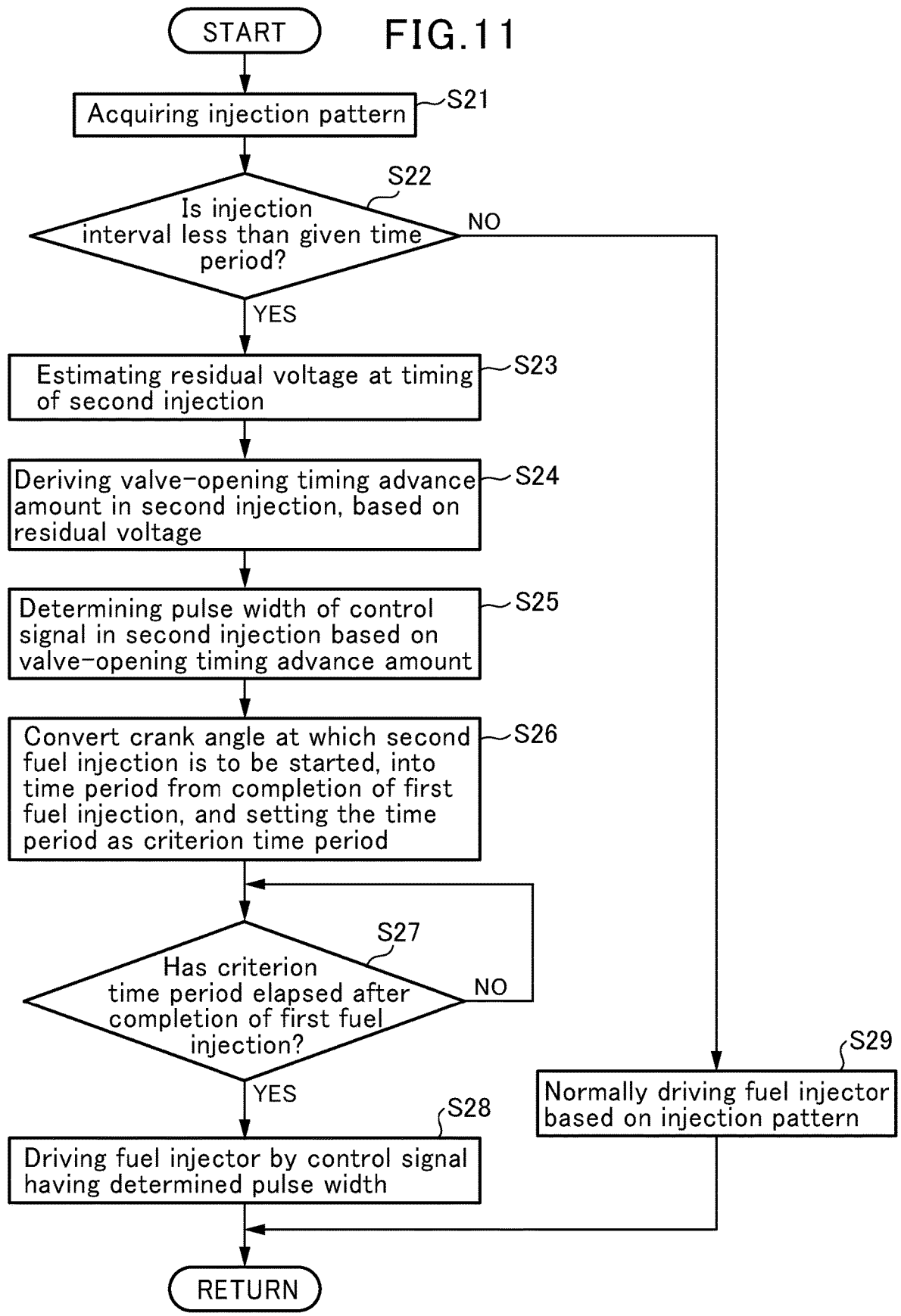
FIG. 11 is a flowchart presenting a second example of the fuel injection control in this embodiment.

Next, with reference to FIG. 11, the second example of the fuel injection control in this embodiment will be described. FIG. 11 is a flowchart presenting the second example of the fuel injection control in this embodiment. This flow is also repeatedly executed by the PCM 10.

Processings in steps S21, S22 and S29 are the same as those in the steps S11, S12 and S17, respectively, and thus their description will be omitted. The following description will be made about processings in steps S23 and subsequent steps.

The processing in the step S23 is executed when the injection interval is determined to be less than the given time period (step S22: YES). In the step S23, the PCM 10 operates to estimate the residual voltage at start of the second fuel injection (i.e., at a timing of opening the fuel injector 67 in the second fuel injection) by referring to the attenuation characteristic of the residual voltage in the solenoid of the fuel injector 67, preliminarily acquired from the detection signal of the voltage sensor SW19. In this case, the start timing of the second fuel injection is defined by a crank angle, and therefore the PCM 10 operates to convert this crank angle into a time period (specifically, an elapsed time from completion of the first fuel injection), based on a current engine speed, and obtain a value of the residual voltage corresponding to the converted time period by referring to the attenuation characteristic of the residual voltage. For example, the attenuation characteristic of the residual voltage is defined by a map presenting the relationship between the elapsed time and the residual voltage as depicted in FIG. 6 (the pulse width of the control signal may be used as an additional parameter defining the map). In the case of estimating the residual voltage at start of the second fuel injection, based on the attenuation characteristic, the PCM 10 may be configured to additionally take into account a voltage or current supplied to the fuel injector 67. In this case, the attenuation characteristic may be defined using a voltage or current to be supplied to the fuel injector 67.

Subsequently, in the step S24, based on the estimated residual voltage in the step S23, the PCM 10 operates to derive an amount of advance of the valve-opening timing (valve-opening timing advance amount) of the fuel injector 67 in the second fuel injection. This valve-opening timing advance amount means a level at which the valve-opening timing of the fuel injector 67 is advanced with respect to a reference valve-opening timing (a valve-opening timing of the fuel injector 67 in a state in which the residual voltage in the solenoid is approximately 0), when the PCM 10 operates to give a valve-opening instruction to the fuel injector 67. The valve-opening timing advance amount is expressed by time (msec). For example, a map presenting a relationship between the residual voltage in the solenoid of the fuel injector 67, and the valve-opening timing advance amount according to the residual voltage is preliminarily prepared (in one example, it is prepared from a graph presenting the relationship between the residual voltage, and the time period after issuing an injection instruction through until the fuel injector is opened, as depicted in FIG. 7), and the PCM operates to acquire a value of the valve-opening timing advance amount corresponding to the residual voltage estimated in the step S23, by referring to the above map.

Subsequently, in the step S25, based on the valve-opening timing advance amount derived in the step S24, the PCM 10 operates to determine the pulse width of the control valve to be applied to the fuel injector 67 in the second fuel injection. Specifically, the PCM 10 operates to subtract a pulse width corresponding to an increment in the fuel injection amount according to the valve-opening timing advance amount, from a pulse width of an original control signal (e.g., the pulse width included in the injection pattern acquired in the step S21), to determine a value of the pulse width of the control signal to be finally applied. In this case, the PCM 10 operates to gradually shorten the finally-applied pulse width of the control signal, along with an increase in the valve-opening timing advance amount.

Subsequently, in the step S26, the PCM 10 operates to convert the crank angle at which the second fuel injection is to be started, into a time period from completion of the first fuel injection, based on a current engine speed, and set the converted time period as a criterion time period. Subsequently, after completion of the first fuel injection, the PCM 10 operates to count up time from the time of completion of the first fuel injection by a timer, and, in step S27, the PCM 10 operates to determine whether or not the counted time reaches the criterion time period set in the step S26. That is, the PCM 10 operates to determine whether or not the criterion time period has elapsed after completion of the first fuel injection. As a result, when the criterion time period is determined to have elapsed after completion of the first fuel injection (step S27: YES), the processing routine proceeds to step S28. In step S28, the PCM 10 operates to drive the fuel injector 67 by the control signal having the pulse width determined in the step S25. On the other hand, when the criterion time period is determined to not have elapsed after completion of the first fuel injection (step S27: NO), the processing routine returns to the step S27, and the PCM 10 will repeat the determination in the step S27 until the counted time reaches the criterion time period.

<Functions/Advantageous Effects>

Next, functions/advantageous effects of the engine fuel injection control device according to this embodiment will be described.

In the engine fuel injection control device according to this embodiment, a residual voltage corresponding to a residual magnetism in the solenoid of the fuel injector 67 is detected, and the valve-open period of the fuel injector 67 is gradually shortened as the detected residual voltage has a larger value (see, particularly, the first example), so that it becomes possible to apply, to the fuel injector 67, an adequate valve-open period set by taking into account an influence of the residual magnetism in the solenoid of the fuel injector 67. This makes it possible to adequately inject a desired amount (required amount) of fuel from the fuel injector 67, irrespective of the influence of the residual magnetism in the solenoid of the fuel injector 67. As a result, it is possible to adequately suppress variation in output torque, degradation in emission quality, or the like, due to deviation of the fuel injection amount from its desired amount. Further, the residual voltage in the solenoid of the fuel injector 67 is a parameter adequately expressing the residual magnetism in the solenoid, and can be adequately detected by providing the voltage sensor SW19 on a connection line between the PCM 10 and the solenoid of the fuel injector 67, so that it is possible to realize the fuel injection control according to this embodiment, by a simple configuration.

In the engine fuel injection control device according to this embodiment, the attenuation characteristic of the residual voltage in the solenoid of the fuel injector 67 is derived based on a voltage change detected by the voltage sensor SW19, and the residual voltage at a timing of triggering fuel injection is estimated from the attenuation characteristic, to correct the valve-open period of the fuel injector 67 (see, particularly, the second example). Specifically, the valve-open period of the fuel injector 67 is gradually shortened as the estimated residual voltage has a larger value. This also makes it possible to adequately inject a desired amount of fuel from the fuel injector 67, irrespective of the influence of the residual magnetism in the solenoid of the fuel injector 67.

In the engine fuel injection control device according to this embodiment, the PCM 10 is operable, with regard to the first fuel injection, to perform control of opening the fuel injector 67 based on crank angle, and, with regard to the second fuel injection, to perform control of opening the fuel injector 67 based on an elapsed time from completion of the first fuel injection. More specifically, a crank angle at which the second fuel injection is to be started is converted into an elapsed time from completion of the first fuel injection, based on an engine speed, and the control of opening the fuel injector 67 is performed using this converted time as a criterion time period. Thus, it is possible to open the fuel injector 67 at a desired timing, irrespective of a change in crank angle speed, and apply, to the fuel injector 67, an adequate valve-open period set while taking into account the influence of the residual magnetism according to the valve-opening timing. This also makes it possible to adequately inject a desired amount of fuel from the fuel injector 67, irrespective of the influence of the residual magnetism in the solenoid of the fuel injector 67.

In the engine fuel injection control device according to this embodiment, when the residual voltage is estimated from the attenuation characteristic in the aforementioned manner, a crank angle at which the fuel injector 67 is to be opened is converted into a time period, and the residual voltage is estimated from the attenuation characteristic, using the converted time period, so that it is possible to improve accuracy in estimate of the residual voltage. Specifically, it becomes possible to adequately estimate the residual voltage, irrespective of a change in crank angle speed.

<Modifications>

Although the above embodiment has been shown and described based on an example in which the present invention is applied to the second fuel injection, the present invention can also be applied to the third or any subsequent fuel injection. In the case where the present invention is applied to the third or any subsequent fuel injection, the fuel injection control (particularly, control regarding the valve-opening timing of the fuel injector 67) may be executed, using an elapsed time from completion of the first fuel injection, or an elapsed time from completion of the last fuel injection.

Further, although the above embodiment has been shown and described based on an example in which the present invention is applied to the HCCI engine, the present invention can also be applied, for example, to a diesel engine or the like.

LIST OF REFERENCE SIGNS 1 engine
10 PCM 18 cylinder
21 intake valve
22 exhaust valve
25 spark plug
67 fuel injector
SW19 voltage sensor

The invention claimed is:

1. An engine fuel injection control device equipped with a solenoid-type fuel injector, comprising:
a voltage sensor configured to detect a voltage of a solenoid in the fuel injector; and
a controller configured to set a valve-open period of the fuel injector based on a fuel injection amount according to an operation state of the engine, in order to control the fuel injector based on the set valve-open period,
wherein the controller is configured to correct the set valve-open period so that said valve-open period becomes shorter as the voltage detected by the voltage sensor at the time of opening the fuel injector becomes larger, in order to control the fuel injector based on the corrected valve-open period,
wherein the controller is configured to derive an attenuation characteristic of a residual voltage of the solenoid in the fuel injector based on a variation of the voltage detected by the voltage sensor, and to estimate the residual voltage at the timing of fuel injection, from the derived attenuation characteristic, in order to correct the set valve-open period based on the estimated residual voltage, and
wherein the attenuation characteristic is a relationship between an elapsed time from a completion of fuel injection and the voltage of the solenoid detected by the voltage sensor, which corresponds to the residual voltage of the solenoid.

2. An engine fuel injection control device equipped with a solenoid-type fuel injector, comprising:
a voltage sensor configured to detect a voltage of a solenoid in the fuel injector; and
a controller configured to derive an attenuation characteristic of a residual voltage of the solenoid in the fuel injector based on a variation of the voltage detected by the voltage sensor, and configured to set a valve-open period of the fuel injector based on an fuel injection amount according to an operation state of the engine, in order to control the fuel injector based on the set valve-open period,
wherein the attenuation characteristic is a relationship between an elapsed time from a completion of fuel injection and the voltage of the solenoid detected by the voltage sensor, which corresponds to the residual voltage of the solenoid, and
wherein the controller is configured to estimate the residual voltage at the timing of fuel injection, from the derived attenuation characteristic, and is configured to correct the set valve-open period based on the estimated residual voltage.

3. The engine fuel injection control device according to claim 2,
wherein the controller is configured to correct the set valve-open period so that the said valve-open period becomes shorter as the residual voltage becomes larger.

4. The engine fuel injection control device according to claim 1,
wherein the controller is configured to control the fuel injector to perform fuel injection two times or more for each combustion event in a cylinder of the engine, and is configured to correct the valve-open period of the fuel injector at the time of a second or subsequent fuel injection.

5. The engine fuel injection control device according to claim 1,
wherein the controller is configured to perform the setting correcting of the valve-open period, and the control of the fuel injector based on said valve-open period, when an injection interval between fuel injections from the fuel injector is less than a predetermined time.

6. The engine fuel injection control device according to claim 1,
wherein the controller is configured to control the fuel injector to perform fuel injection two times for each combustion event in a cylinder of the engine, and is configured to correct the valve-open period of the fuel injector based on the voltage detected by the voltage sensor at the start of a second fuel injection.

7. The engine fuel injection control device according to claim 2,
wherein the controller is configured to control the fuel injector to perform fuel injection two times or more for each combustion event in a cylinder of the engine, and is configured to correct the valve-open period of the fuel injector at the time of a second or subsequent fuel injection.

8. The engine fuel injection control device according to claim 2,
wherein the controller is configured to perform the correcting of the valve-open period, and the control of the fuel injector based on said valve-open period, when an injection interval between fuel injections from the fuel injector is less than a predetermined time.

9. The engine fuel injection control device according to claim 2,
wherein the controller is configured to control the fuel injector to perform fuel injection two times for each combustion event in a cylinder of the engine, and is configured to correct the valve-open period of the fuel injector based on the voltage detected by the voltage sensor at the start of a second fuel injection.

10. The engine fuel injection control device according to claim 1,
wherein the attenuation characteristic is configured such that the voltage of the solenoid is attenuated in accordance with an exponential function after the elapsed time becomes a first given value until the elapsed time becomes a second given value larger than the first given value.

11. The engine fuel injection control device according to claim 2,
wherein the attenuation characteristic is configured such that the voltage of the solenoid is attenuated in accordance with an exponential function after the elapsed time becomes a first given value until the elapsed time becomes a second given value larger than the first given value.

12. The engine fuel injection control device according to claim 1,
wherein the attenuation characteristic is configured such that the voltage of the solenoid is maintained at a constant value when the elapsed time is less than a first given value, and the voltage of the solenoid is maintained at a constant value when the elapsed time is equal to or greater than a second given value larger than the first given value.

13. The engine fuel injection control device according to claim 2,
wherein the attenuation characteristic is configured such that the voltage of the solenoid is maintained at a constant value when the elapsed time is less than a first given value, and the voltage of the solenoid is maintained at a constant value when the elapsed time is equal to or greater than a second given value larger than the first given value.

14. The engine fuel injection control device according to claim 1,
wherein the controller is configured to:
control the fuel injector to perform fuel injection two times or more for each combustion event in a cylinder of the engine;
acquire an injection pattern for injecting fuel from the fuel injector, according to an operation state of the engine;
obtain an injection interval between a first fuel injection and a second fuel injection, from the injection pattern, in order to determine whether or not the injection interval is less than a given time period;
control the fuel injector according to the injection pattern, when the injection interval is less than the given time period; and
control the fuel injector according to an injection pattern in which an injection period for the second fuel injection is corrected based on the residual voltage, when the injection interval is equal to or greater than the given time period.

15. The engine fuel injection control device according to claim 2,
wherein the controller is configured to:
control the fuel injector to perform fuel injection two times or more for each combustion event in a cylinder of the engine;
acquire an injection pattern for injecting fuel from the fuel injector, according to an operation state of the engine;
obtain an injection interval between a first fuel injection and a second fuel injection, from the injection pattern, in order to determine whether or not the injection interval is less than a given time period;
control the fuel injector according to the injection pattern, when the injection interval is less than the given time period; and
control the fuel injector according to an injection pattern in which an injection period for the second fuel injection is corrected based on the residual voltage, when the injection interval is equal to or greater than the given time period.

16. The engine fuel injection control device according to claim 14,
wherein the controller is configured to:
convert a crank angle at which the second fuel injection is to be started, into a time period from completion of the first fuel injection, based on a current engine speed, in order to set the time period as a criterion time period;
determine whether or not the criterion time period has elapsed after a completion of the first fuel injection;
control the fuel injector according to the injection pattern in which the injection period for the second fuel injection is corrected based on the residual voltage, when the criterion time period has elapsed after the completion of the first fuel injection; and
repeat determining whether or not the criterion time period has elapsed after the completion of the first fuel injection, until the criterion time period has elapsed, in order to restrict controlling the fuel injector according to the injection pattern in which the injection period for the second fuel injection is corrected based on the residual voltage, when the criterion time period has not elapsed after the completion of the first fuel injection.

17. The engine fuel injection control device according to claim 15,
wherein the controller is configured to:
convert a crank angle at which the second fuel injection is to be started, into a time period from completion of the first fuel injection, based on a current engine speed, in order to set the time period as a criterion time period;
determine whether or not the criterion time period has elapsed after a completion of the first fuel injection;
control the fuel injector according to the injection pattern in which the injection period for the second fuel injection is corrected based on the residual voltage, when the criterion time period has elapsed after the completion of the first fuel injection; and
repeat determining whether or not the criterion time period has elapsed after the completion of the first fuel injection, until the criterion time period has elapsed, in order to restrict controlling the fuel injector according to the injection pattern in which the injection period for the second fuel injection is corrected based on the residual voltage, when the criterion time period has not elapsed after the completion of the first fuel injection.

* * * * *